United States Patent
Cho et al.

(10) Patent No.: US 8,737,293 B2
(45) Date of Patent: May 27, 2014

(54) APPARATUS AND METHOD FOR SUPPORTING DIFFERENT FRAME STRUCTURES IN BROADBAND WIRELESS COMMUNICATION SYSTEM

(75) Inventors: Min-Hee Cho, Suwon-si (KR); Jae-Hee Cho, Seoul (KR); Nam-Gi Kim, Suwon-si (KR); Hyon-Goo Kang, Suwon-si (KR); June Moon, Seoul (KR); Kwan-Hee Roh, Hwaseong-si (KR)

(73) Assignee: Samsung Electronics Co., Ltd (KR)

(*) Notice: Subject to any disclaimer, the term of this patent is extended or adjusted under 35 U.S.C. 154(b) by 1398 days.

(21) Appl. No.: 12/024,225

(22) Filed: Feb. 1, 2008

(65) Prior Publication Data

US 2008/0186910 A1 Aug. 7, 2008

(30) Foreign Application Priority Data

Feb. 1, 2007 (KR) .................. 10-2007-0010385

(51) Int. Cl.
 *H04W 4/00* (2009.01)
(52) U.S. Cl.
 USPC ........... 370/328; 370/208; 370/319; 370/335; 370/469
(58) Field of Classification Search
 USPC ......................................... 370/208
 See application file for complete search history.

(56) References Cited

U.S. PATENT DOCUMENTS

| | | | |
|---|---|---|---|
| 2002/0141365 A1* | 10/2002 | Leung | 370/335 |
| 2005/0232181 A1* | 10/2005 | Park et al. | 370/319 |
| 2006/0067232 A1 | 3/2006 | Lee et al. | |
| 2006/0153112 A1* | 7/2006 | Lim et al. | 370/310 |
| 2007/0160082 A1* | 7/2007 | Un et al. | 370/469 |
| 2007/0286066 A1* | 12/2007 | Zhang et al. | 370/208 |
| 2008/0032625 A1* | 2/2008 | Cheung et al. | 455/39 |
| 2008/0107047 A1* | 5/2008 | Olfat | 370/280 |
| 2009/0073924 A1 | 3/2009 | Chou | |

FOREIGN PATENT DOCUMENTS

| | | |
|---|---|---|
| KR | 1019990034353 | 5/1999 |
| KR | 1020030004946 | 1/2003 |
| KR | 1020070013984 | 1/2007 |
| KR | 1020080072116 | 8/2008 |
| KR | 100932570 | 12/2009 |
| KR | 1020090132250 | 12/2009 |

* cited by examiner

*Primary Examiner* — Ayaz Sheikh
*Assistant Examiner* — Hai-Chang Hsiung
(74) *Attorney, Agent, or Firm* — The Farrell Law Firm, P.C.

(57) ABSTRACT

An apparatus and method for supporting different frame structures in a broadband wireless communication system are provided. A communication method of a Base Station (BS) includes determining a frame structure to be provided. A MAP message including an indicator that indicates a new standard is generated, when the provided frame structure conforms to the new standard. The generated MAP message is transmitted by performing physical layer encoding thereon. Accordingly, signaling is defined to report a currently provided frame structure to an MS, and thus, a system can support different frame structures.

19 Claims, 11 Drawing Sheets

APPARATUS AND METHOD FOR SUPPORTING DIFFERENT FRAME STRUCTURES IN BROADBAND WIRELESS COMMUNICATION SYSTEM

PRIORITY

This application claims priority under 35 U.S.C. §119(a) to a Korean patent application filed in the Korean Intellectual Property Office on Feb. 1, 2007 and assigned Serial No. 2007-10385, the entire disclosure of which is hereby incorporated by reference.

BACKGROUND OF THE INVENTION

1. Field of the Invention

The present invention relates generally to an apparatus and method for supporting different frame structures in a broadband wireless communication system, and more particularly, to an apparatus and method for communicating a control message including frame structure information in a broadband wireless communication system supporting different frame structures.

2. Description of the Related Art

Many wireless communication techniques are being proposed to achieve high-speed mobile communication. Among them, an Orthogonal Frequency Division Multiplexing (OFDM) scheme or an Orthogonal Frequency Multiple Access (OFDMA) scheme is accepted as one of the most promising techniques for a next generation wireless communication. The OFDM scheme is expected to be widely utilized in most of the wireless communication techniques in the future. In addition, the OFDM or OFDMA scheme is currently used as a standard in an Institute of Electrical and Electronics Engineers (IEEE) 802.16 based Wireless Metropolitan Area Network (WMAN) known as a 3.5 generation technology.

In order to facilitate flexible allocation of Uplink (UL)/Downlink (DL) resources in a Broadband Wireless Access (BWA) system based on the OFDM scheme, a Base Station (BS) transmits information regarding UL/DL resource allocation for each frame. For this purpose, a MAP message is used in the IEEE 802.16 based system.

Figure 1:
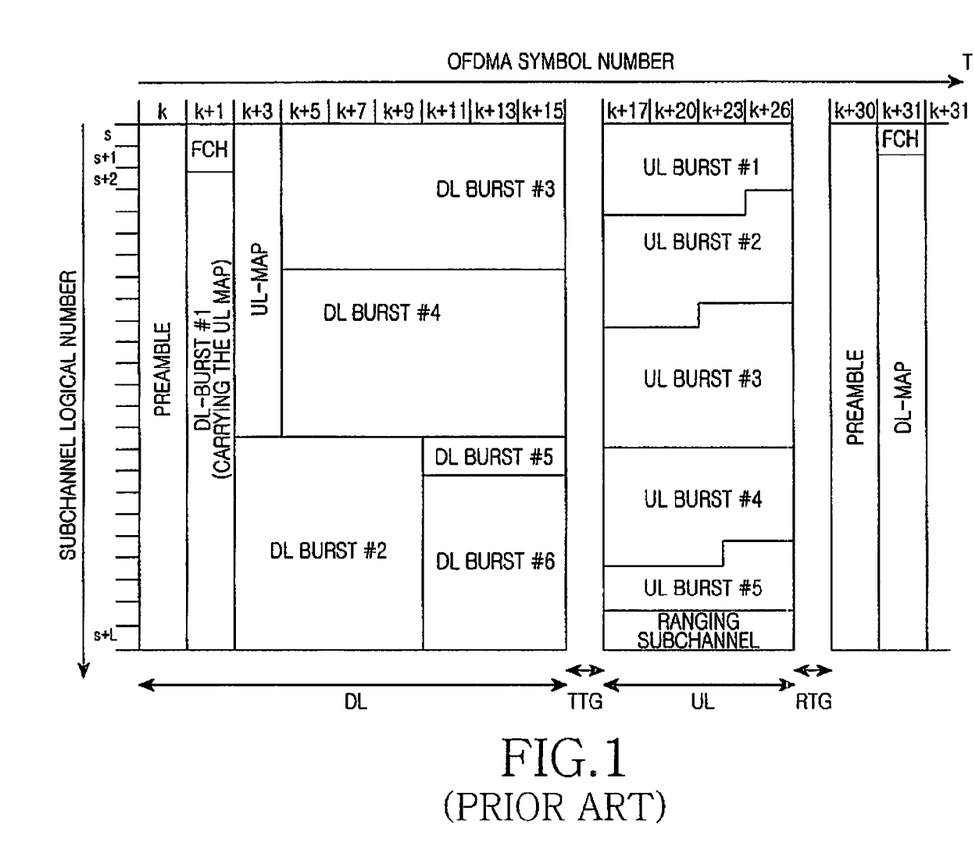
FIG. 1 is a diagram illustrating a frame structure of a conventional Institute of Electrical and Electronics Engineers (IEEE) 802.16 based system.

FIG. 1 is a diagram illustrating a frame structure of a conventional IEEE 802.16 based system.

Referring to FIG. 1, a frame includes one DL frame and one UL frame. The DL frame is defined as a period in which a BS transmits data to a plurality of Mobile Stations (MSs). The UL frame is defined as a period in which the MSs transmit data to the BS.

The DL frame includes a preamble, a Frame Control Header (FCH), a DL-MAP, a UL-MAP, and a plurality of DL bursts. The UL frame includes a control region and a UL burst region. The DL preamble is used when an MS obtains initial synchronization and searches for a cell. The FCH contains information indicating a basic structure of the frame. The DL-MAP contains Information Elements (IEs) indicating a region of the DL bursts (e.g., location and size). The UL-MAP contains IEs indicating a UL frame structure.

The UL frame includes a ranging region and a plurality of UL bursts. The ranging region is defined as a region in which an MS can transmit a random access code. The ranging region is used to perform an initial network access, to request a handoff, to request resource allocation, etc.

In general, the frame structure is determined by the BS. For each frame, the MS receives the DL-MAP and UL-MAP transmitted from the BS, and thus recognizes the frame structure and resource allocation information.

In comparison with a legacy system, a communication system is being evolved to provide a high-speed data service or to solve implementation issues by modifying a standard or the like. In such a process, various systems may co-exit in the same area according to a compatibility with the legacy system. For example, in an area where an IEEE 802.16e system (i.e., legacy system) is installed, a new system, which is more evolved than the legacy system may be installed. In this case, the new system must be able to provide a service not only to a legacy MS but also to a new MS.

That is, the new system must support not only an old frame which includes an old MAP, burst, and control channel but also a new frame which includes a new MAP, burst, and control channel. In addition, the new MS must be able to distinguish an old frame structure and a new frame structure, and the legacy MS must be able to operate without errors upon receiving a new frame.

SUMMARY OF THE INVENTION

The present invention has been made to address at least the above-mentioned problems and/or disadvantages and to provide at least the advantages described below. Accordingly, an aspect of the present invention provides an apparatus and method for providing different frame structures in a broadband wireless communication system.

Another aspect of the present invention provides an apparatus and method for communicating a control message including frame structure information in a broadband wireless communication system supporting different frame structures.

An additional aspect of the present invention provides an apparatus and method for communicating a control message including frame version information in a broadband wireless communication system supporting different frame structures.

A further aspect of the present invention provides a new MAP message structure compatible with an old standard in a broadband wireless communication system supporting different frame structures.

According to an aspect of the present invention, a Base Station (BS) apparatus in a broadband wireless communication system supporting different frame structures is provided. The apparatus includes a controller for determining a frame structure to be provided, and a first Media Access Control (MAC) processor for generating a MAP message including an indicator that indicates a new standard if the provided frame structure conforms to the new standard. The apparatus also includes a first Transmit (Tx) modem for performing physical layer encoding on the message generated by the first MAC processor.

According to another aspect of the present invention, a Mobile Station (MS) apparatus in a broadband wireless communication system supporting different frame structures is provided. The apparatus includes a Receive (Rx) modem for obtaining frame synchronization by using a preamble signal and then for receiving and decoding at least one MAP message received in at least one frequency band. The apparatus also includes a MAC processor for determining whether the MAP message conforms to a new standard by using a MAP indicator included in the MAP message received from the Rx modem.

According to an additional aspect of the present invention, a communication method of a BS in a broadband wireless communication system supporting different frame structures is provided. A frame structure to be provided is determined. A MAP message including an indicator that indicates a new standard if the provided frame structure conforms to the new standard is generated. The generated MAP message is transmitted by performing physical layer encoding thereon.

According to a further aspect of the present invention, a communication method of an MS in a broadband wireless communication system supporting different frame structures is provided. Frame synchronization is obtained by using a preamble signal. At least one MAP message received in at least one frequency band is received and decoded after obtaining the frame synchronization. It is determined whether the MAP message conforms to a new standard by checking a MAP indicator included in the MAP message. The remaining fields included in the MAP are analyzed according to the new standard, when the MAP message conforms to the new standard.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described in detail below with reference to the accompanying drawings. The same or similar reference numbers are used throughout the drawings to represent the same or similar elements. Detailed descriptions of constructions or processes known in the art may be omitted to avoid obscuring the subject matter of the present invention.

Hereinafter, a technique of the present invention will be described which provides different frame structures in a broadband wireless communication system. In particular, the present invention proposes a technique for indicating frame structure information (or frame version information) by using a MAP message when the different frame structures are provided.

Figure 2:
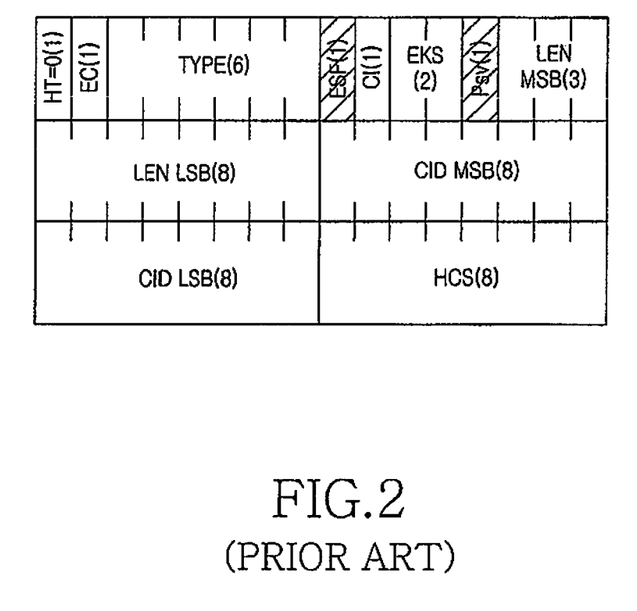
FIG. 2 is a diagram illustrating a structure of a generic Media Access Control (MAC) header in a conventional broadband wireless communication system.

In a legacy system, a DownLink (DL)-MAP begins with a generic Media Access Control (MAC) header as shown in FIG. 2. A MAP format is divided according to values of first two bits (i.e., Header Type (HT) and Encryption Control (EC)) of the generic MAC header. Specifically, if HT=0, it means a normal MAP, and if HT/EC=11, it mesas a compressed MAP (or compressed/reduced private DL-MAP). Conventionally, a frame supports only a "normal MAP" and a "compressed MAP". Since the normal MAP and the compressed MAP include a plurality of MAP Information Elements (IEs) having the same format, it can be said that the normal MAP and the compressed MAP have the same kind of MAP format except for some different fields.

In general, a MAP message produces a large amount of overhead. Therefore, a new MAP message having a small amount of overhead has been proposed for throughput improvement. That is, the present invention proposes a technique in which a Mobile Station (MS) can distinguish an old MAP message and a new MAP message when a new frame structure using the new MAP message is provided.

An example of the MAP message proposed in the present invention is described in Table 1 below.

TABLE 1

| Syntax | Size (bits) | Notes |
| --- | --- | --- |
| New_MAP_Format( ){ | | |
|   MAP_Indicator | 2 | 00/01: Normal MAP |
| | | 10: New MAP |
| | | 11: Compressed MAP |
|   If(MAP_Indicator==00 or MAP_Indicator==01){ | | Normal MAP |
|     Normal MAP Fields and IEs | | |
|     ... | | |
|   }else if(MAP_Indicator==11){ | | |
|     Compressed MAP Fields and IEs | | Compressed MAP |
|     ... | | |
|   }else { | | New MAP |
|     Information fields | | Fields in New MAP |
|   } | | |

As shown in Table 1 above, in order to ensure backward compatibility with an old frame, a first field of the MAP begins with a MAP indicator. If the MAP indicator is '00' or '01', it indicates a normal MAP. If the MAP indicator is '11', it indicates a compressed MAP. If the MAP indicator is '10', it indicates a new MAP message. The new MAP message newly defines not only a fixed field but also a MAP IE and a UL control channel structure, and thus overhead can be significantly reduced.

Another example of the MAP message proposed in the present invention is described in Table 2 below.

TABLE 2

| Syntax | Size (bits) | Notes |
| --- | --- | --- |
| New_MAP_Format( ){ | | |
|     MAP_Indicator | 2 | 00/01: Normal MAP |
| | | 10: New MAP |
| | | 11: Compressed MAP |
|     If(MAP_Indicator==00 or MAP_Indicator==01){ | | Normal MAP |
|         Normal MAP Fields and IEs | | |
|     ... | | |
|     }else if(MAP_Indicator==11){ | | |
|         Compressed MAP Field and IEs | | Compressed MAP |
|     ... | | |
|     }else { | | New MAP |
|         MAP Version Index | v | Version Index of this frame Nth version of frame is expressed by [N mod $2^v$] Version Index |
|         Information fields | | Information Elements depending on MAP Version Index(The format of these fields shall be changed depending on version index) |
| } | | |

As shown in Table 2 above, when a MAP indicator is set to '10' and thus indicates a new MAP, the MAP message begins with a MAP version index so that various versions of MAP can be supported. If a field of the MAP version index indicates v-bit, $2^v$ new MAP structures can be supported. In addition, if a length of the version index is v bits, and a version of a current frame is N, then the version index may be defined as [N mod $2^v$]. That is, even if the version continuously increases, the number of frame structures that can be simultaneously supported may be constantly maintained to be $2^v$.

An MS may support several versions of MAP structures (or frame structures) or may support only one version thereof. If the several versions of frame structures are supported, the MS can distinguish a version of a specific frame by using a MAP indicator and a MAP version index. When the MS supports the several versions of frame structures, the MS can use all frames with the versions that can be analyzed by the MS itself. Meanwhile, when the MS supports only an old frame structure, if the MAP indicator is '10', the MS classifies a corresponding frame as a frame that cannot be used by the MS itself, and thus does not perform communication for this frame period.

As such, a system has been evolved to simultaneously provide various versions of frame structures. The system that simultaneously provides two different frame structures will be described hereinafter for example.

Figure 3:
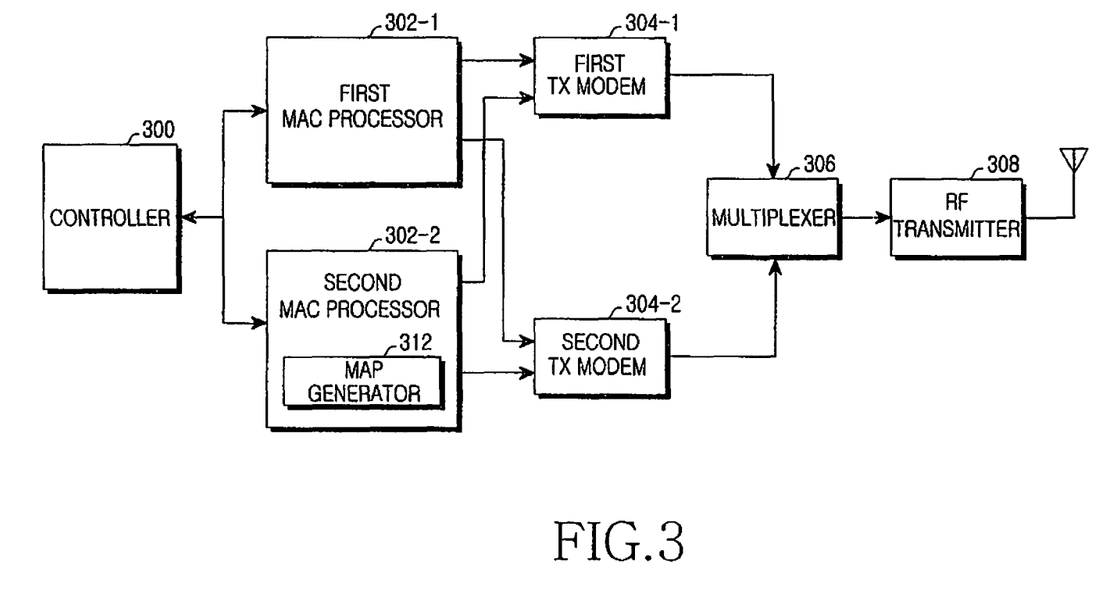
FIG. 3 is a block diagram illustrating a Base Station (BS) in a broadband wireless communication system supporting different frame structures according to an embodiment of present invention.

FIG. 3 is a block diagram illustrating a Base Station (BS) in a broadband wireless communication system supporting different frame structures according to an embodiment of the present invention.

Referring to FIG. 3, the BS includes a controller 300, a first MAC processor 302-1, a second MAC processor 302-2, a first Transmit (Tx) modem 304-1, a second Tx modem 304-2, a multiplexer 306, and a Radio Frequency (RF) transmitter 308.

Figure 9:
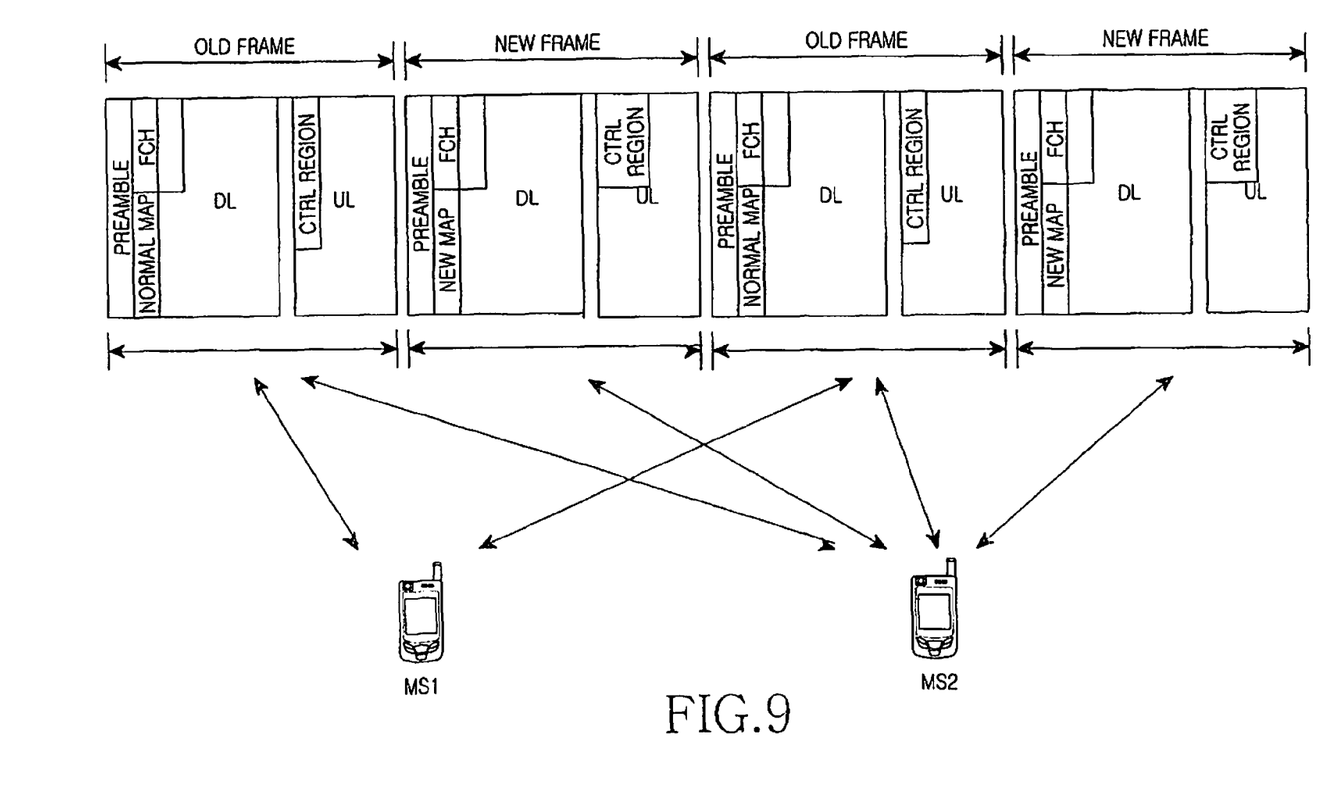
FIG. 9 is a diagram illustrating an example for supporting different frame structures in a broadband wireless communication system according to an embodiment of the present invention.
Figure 10:
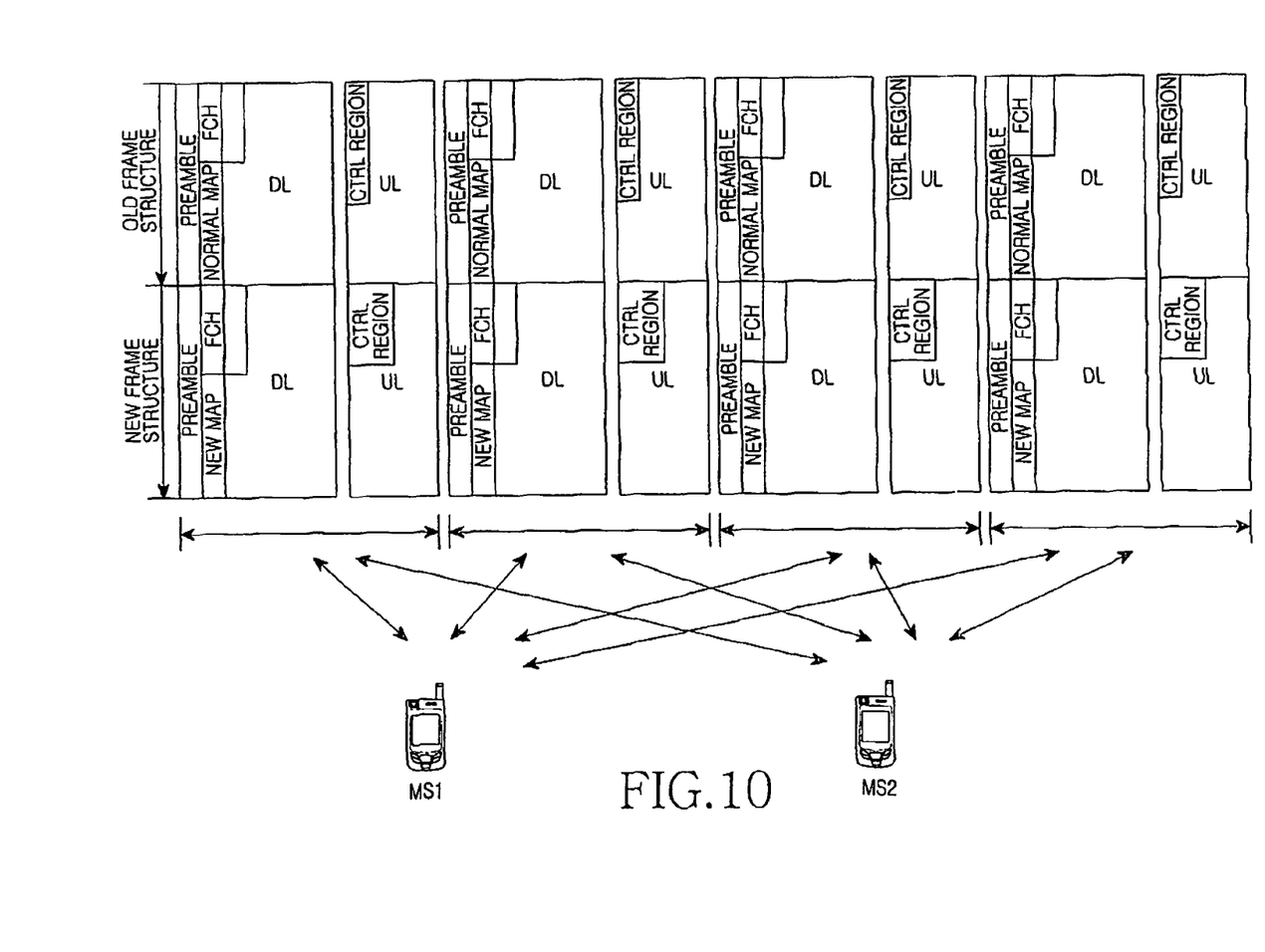
FIG. 10 is a diagram illustrating another example for supporting different frame structures in a broadband wireless communication system according to an embodiment of the present invention.

The controller 300 controls an overall operation of the BS. That is, the controller 300 determines a frame structure that is provided in a current time period. Further, the controller 300 controls generation and transmission of various control signals (e.g., a preamble, a Frame Control Header (FCH), a MAP, etc.) transmitted in the determined frame structure, and also controls transmission/reception according to the determined frame structure. If transmission is made in a Time Division Multiplexing (TDM) manner, only one frame structure among different frame structures can be provided in the current time period. On the other hand, if transmission is made in a Frequency Division Multiplexing (FDM) manner, a plurality of frame structures can be provided in the current time period. For example, different frame structures can be provided in a TDM manner as shown in FIG. 9, and different frame structures can be provided in an FDM manner as shown in FIG. 10. It is assumed that resource scheduling is performed by the controller 300.

The first MAC processor 302-1 performs MAC layer processing on Tx data received from an upper layer (e.g., Internet Protocol (IP) layer unit) and then delivers the Tx data to the first Tx modem 304-1. Further, the first MAC processor 302-1 performs a function for generating and analyzing a control message required for signaling. For example, the first MAC processor 302-1 generates a MAP message according to the scheduling result of the controller 300. It is defined herein that the first MAC processor 302-1 generates and processes a message that conforms to an old standard (hereinafter referred to as a "first standard").

The first Tx modem 304-1 performs physical layer encoding on data (i.e., burst data) received from the first MAC processor 302-1 according to the scheduling result of the controller 300. For example, the first Tx modem 304-1 includes a channel coding block, a modulation block, etc., and modulates a signal received from the first MAC processor 302-1 into a baseband signal. The channel coding block may include a channel encoder, an interleaver, a modulator, etc. The modulation block may include an Inverse Fast Fourier Transform (IFFT) operator for carrying data on a plurality of orthogonal sub-carriers.

The first MAC processor 302-1 and the first Tx modem 304-1 are components for performing communication according to the first standard, and operate under the control of the controller 300 when the old frame structure is provided.

The second MAC processor 302-2 and the second Tx modem 304-2 are components for performing communication according to a new standard (hereinafter referred to as a "second standard"), and operate under the control of the controller 300 when a new frame structure is provided.

According to the present invention, the second MAC processor 302-2 generates a new MAP message through a MAP generator 312, as described in Table 1 and Table 2, and outputs the new MAP message to the second Tx modem 304-2. A structure for transmitting the new MAP message will be described below in detail with reference to FIG. 3.

The multiplexer 306 receives a signal having the first frame structure from the first Tx modem 304-1 and a signal having the second frame structure from the second Tx modem 304-2, and multiplexes the received signals. The multiplexer 306 may multiplex the signals having different frame structures in a TDM manner or in an FDM manner. For example, when the TDM is used as shown in FIG. 9, the multiplexer 306 selects a signal received from the first Tx modem 304-1 and provides the selected signal to the RF transmitter 308 under the control of the controller 300 during a period of providing the first frame structure (i.e., old frame structure), and selects a signal received from the second Tx modem 304-2 and provides the selected signal to the RF transmitter 308 during a period of providing the second frame structure (i.e., new frame structure). For another example, when the FDM is used as shown in FIG. 10, the multiplexer 306 converts a baseband signal received from the first Tx modem 304-1 into a first mid-frequency band signal and converts a baseband signal received from the second Tx modem 304-2 into a second mid-frequency band signal, and then synthesizes the two converted signals.

The RF transmitter 308 converts a signal received from the multiplexer 306 into an RF signal that can be transmitted in practice, and then transmits the converted signal through an antenna. In FIG. 3, since physical layer encoding performed by the first Tx modem 304-1 is similar to that performed by the second Tx modem 304-2, the first Tx modem 304-1 and the second Tx modem 304-2 may be implemented as one element in practice. When an MS can support both the old frame structure and the new frame structure, as shown in FIG. 3, a message processed by the second MAC processor 302-2 may be subject to physical layer encoding performed by the first Tx modem 304-1 before transmission.

Figure 4:
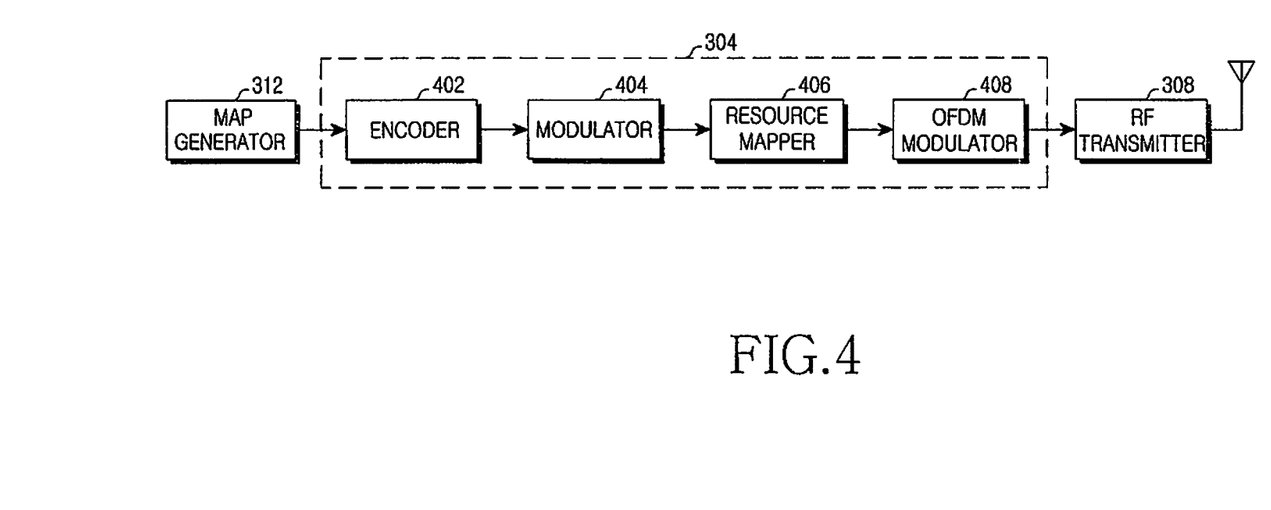
FIG. 4 is a block diagram illustrating a transmitter for transmitting a new MAP message according to an embodiment of the present invention.

FIG. 4 is a block diagram illustrating a transmitter for transmitting a new MAP message according to an embodiment of the present invention.

Referring to FIG. 4, the MAP transmitter includes a MAP generator 312, an encoder 402, a modulator 404, a resource mapper 406, an Orthogonal Frequency Division Multiplexing (OFDM) modulator 408, and an RF transmitter 308. Herein, the encoder 402, the modulator 404, the resource mapper 406, and the OFDM modulator 408 are included in a Tx modem 304.

The MAP generator 312 generates the new MAP message described in Table 1 and Table 2. The new MAP message may include either a MAP indicator that indicates a new MAP (i.e., MAP indicator==10) or a version index that shows MAP version information.

The encoder 402 encodes an information bit-stream received from the MAP generator 312 and generates encoded symbols. For example, the encoder 402 may use a Convolutional Code (CC), a Block Turbo Code (BTC), a Convolutional Turbo Code (CTC), a Zero Tailing Convolutional Code (ZT-CC), etc. The modulator 404 modulates the encoded symbols received from the encoder 402 by using a suitable modulation scheme, and thus generates modulated symbols.

The resource mapper 406 maps data received from the modulator 404 to a predetermined resource (e.g., a head portion of a frame). The OFDM modulator 408 performs OFDM modulation on the resource-mapped data received from the resource mapper 406, and thus generates time-domain data. The OFDM modulation includes Inverse Fast Fourier Transform (IFFT), Cyclic Prefix (CP) insertion, etc.

The RF transmitter 308 converts a signal received from the OFDM modulator 408 into an RF signal that can be transmitted in practice, and transmits the converted signal through an antenna. Upon receiving the new MAP message, an MS determines a frame version by using the MAP indicator and the MAP version index contained in the MAP message. If the determined frame version cannot be supported, the MS analyses the remaining fields included in the MAP message, and then communicates with a BS according to the analysis result.

Figure 5:
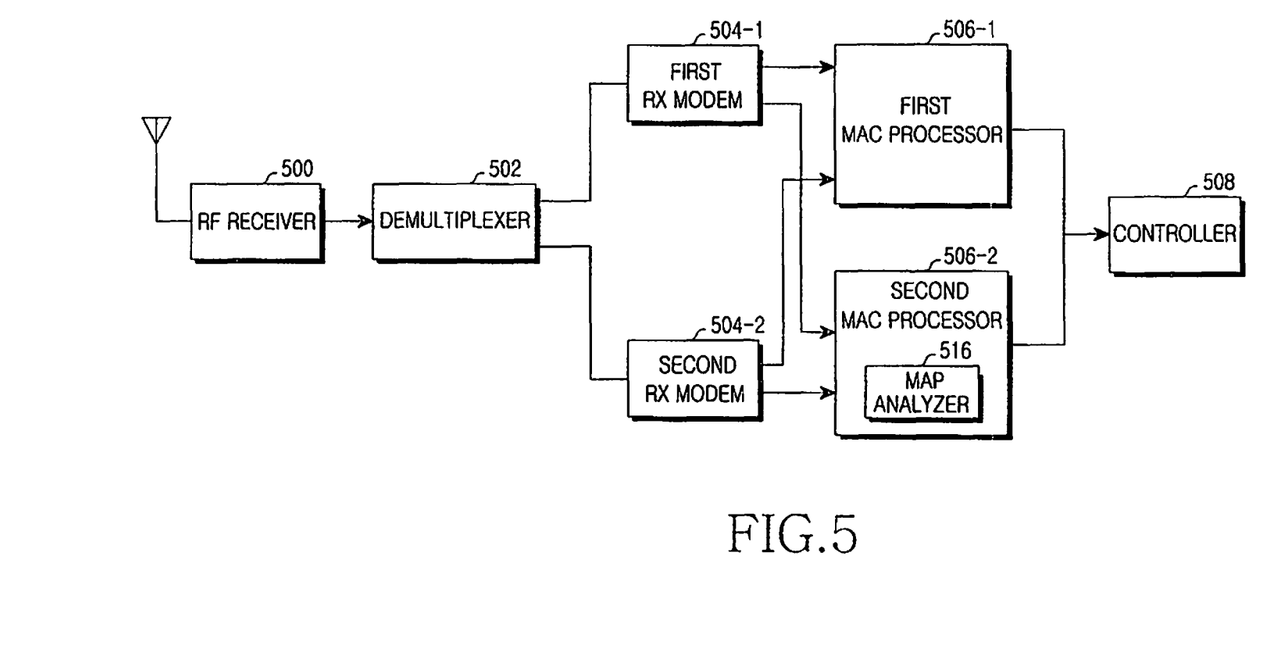
FIG. 5 is a block diagram illustrating a Mobile Station (MS) in a broadband wireless communication system supporting different frame structures according to an embodiment of the present invention.

FIG. 5 is a block diagram illustrating an MS in a broadband wireless communication system supporting different frame structures according to an embodiment of the present invention.

Referring to FIG. 5, the MS includes an RF receiver 500, a demultiplexer 502, a first Receive (Rx) modem 504-1, a second Rx modem 504-2, a first MAC processor 506-1, a second MAC processor 506-2, and a controller 508.

The RF receiver 500 converts a signal received through an antenna into a baseband signal.

The demultiplexer 502 receives a signal from the RF receiver 500 and then delivers the received signal to both the first Rx modem 504-1 and the second Rx modem 504-2 under the control of the controller 508. Alternatively, the demultiplexer 502 may deliver the received signal by selecting either one of the first Rx modem 504-1 and the second Rx modem 504-2. If the received signal has to be decoded according to two standards, the receive signal is provided to both the Rx modems 504-1 and 504-2 under the control of the controller 508. If the received signal has to be decoded according to one standard, the received signal is provided to the selected Rx modem under the control of the controller 508.

According to a MAP message received in a head portion of a frame, the first Rx modem 504-1 performs physical layer decoding on a signal received from the demultiplexer 502. The first Rx modem 504-1 may include a demodulation block, a channel decoding block, etc. If an Orthogonal Frequency Multiple Access (OFDMA) system is used, the demodulation block may include an FFT operator for extracting data carried on a plurality of sub-carriers, and the channel decoding block may include a demodulator, a de-interleaver, a channel decoder, etc.

The first MAC processor 506-1 performs MAC layer processing on data received from the first Rx modem 504-1, and delivers the data to an upper layer. Further, the first MAC processor 506-1 performs a function for generating and analyzing a control message required for signaling. For example, the first MAC processor 506-1 analyzes a MAP message, which conforms to the first standard and is received from a BS, and then provides the analysis result to the controller 508.

The first Rx modem 504-1 and the first MAC processor 506-1 are components for performing communication according to the first standard, and operate under the control of the controller 508 when a frame structure of the first standard is provided.

The second Rx modem 504-2 and the second MAC processor 506-2 are components for performing communication according to the second standard, and operate under the control of the controller 508 when a frame structure of the second standard is provided.

According to an embodiment of the present invention, the second MAC processor 506-2 analyzes the new MAP message in MAP analyzer 516, as described in Table 1 and Table 2, and provides the new MAP message to the controller 508. In this case, the second MAC processor 506-2 determines a frame version by using the MAP indicator and the MAP version index included in the MAP message. Further, if the determined frame version cannot be supported, the second MAC processor 506-2 analyzes the remaining fields included in the MAP message and provides the analysis result to the controller 508. A structure for receiving the new MAP message will be described below in detail with reference to FIG. 6.

The controller 508 controls an overall operation of the MS. That is, the controller 508 determines a frame structure that is provided in a current time period, and controls transmission/reception according to the determined frame structure.

If the first MAC processor 506-1 analyzes the new MAP message, that is, if the MAP indicator of the received MAP message is '10', the first MAC processor 506-1 classifies the MAP message as a MAP message (or frame structure) that cannot be processed by the first MAC processor 506-1 itself, and thus does not perform subsequent operations. That is, when the MS can support only an old standard, if a MAP indicator included in a received MAP message is '10', the MS classifies a corresponding frame into a frame that cannot be used by the MS itself, and does not perform communication during this frame period.

When different frame structures are provided in an FDM manner, one frame may include one or more FCHs and MAPs. Each FCH includes sub-channel information (i.e., frequency band information) used in a corresponding frame structure and also includes information for MAP decoding. In a legacy MS, a segment is obtained by using a preamble, and an FCH is received in an area of the obtained segment. However, in an MS supporting different frame structures, both the FCHs and MAPs received in a plurality of frequency bands have to be decoded.

Therefore, the first Rx modem 504-1 and the second Rx modem 504-2 simultaneously operate until the MAP is decoded. For example, if a frequency domain is divided into two frequency bands, the first Rx modem 504-1 performs physical layer decoding on an FCH and MAP received in a first frequency band, and provides the result to the second MAC processor 506-2. Further, the second Rx modem 504-2 performs physical layer decoding on an FCH and MAP received in a second frequency band, and provides the result to the second MAC processor 506-2. Thereafter, the second Rx modem 504-2 analyzes a MAP message received from the first and second Rx modems 504-1 and 504-2, and determines whether it is an old MAP or a new MAP. A plurality of MAPs received in different frequency bands is analyzed by one element (i.e., the second MAC processor). This is because whether the MAP corresponds to the old MAP or the new MAP can be recognized only after the MAP is finally analyzed.

Figure 6:
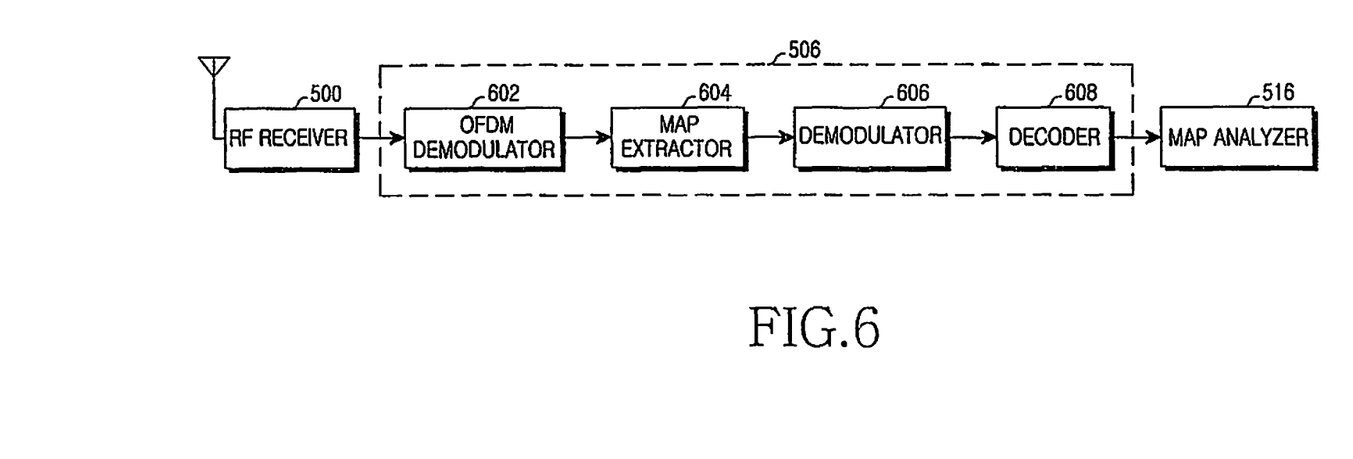
FIG. 6 is a block diagram illustrating a receiver for receiving a new MAP message according to an embodiment of the present invention.

FIG. 6 is a block diagram illustrating a receiver for receiving a new MAP message according to an embodiment of the present invention.

Referring to FIG. 6, the MAP receiver includes an RF receiver 500, an OFDM demodulator 602, a MAP extractor 604, a demodulator 606, a decoder 608, and a MAP analyzer 516.

The RF receiver 500 converts an RF signal received from a BS into a baseband signal. The OFDM demodulator 602 performs OFDM demodulation on a signal received from the RF receiver 500 and thus outputs frequency-domain data. The OFDM demodulation includes CP removal, FFT (Fast Fourier Transform), etc.

The MAP extractor 604 extracts a MAP burst, which is received in a predetermined region included in a frame, from the frequency-domain data. The demodulator 606 demodulates data received from the MAP extractor 604 by using a suitable scheme. The decoder 608 decodes data received from the demodulator 606, and thus restores a MAP message. In this case, the decoder 608 performs a Cyclic Redundancy Check (CRC) operation on the restored MAP message, and if the CRC is successful, provides the MAP message to the MAP analyzer 516.

The MAP analyzer 516 reads the MAP message received from the decoder 608. According to the present invention, the MAP analyzer 516 determines whether the received message can be analyzed by the MAP analyzer 516 itself by using an MAP indicator included in the MAP message. If the message can be analyzed, the MAP analyzer 516 analyzes the remaining fields included in the MAP message, and provides the analysis result to the controller 508. In this case, a frame version can be checked using a MAP version index.

Figure 7:
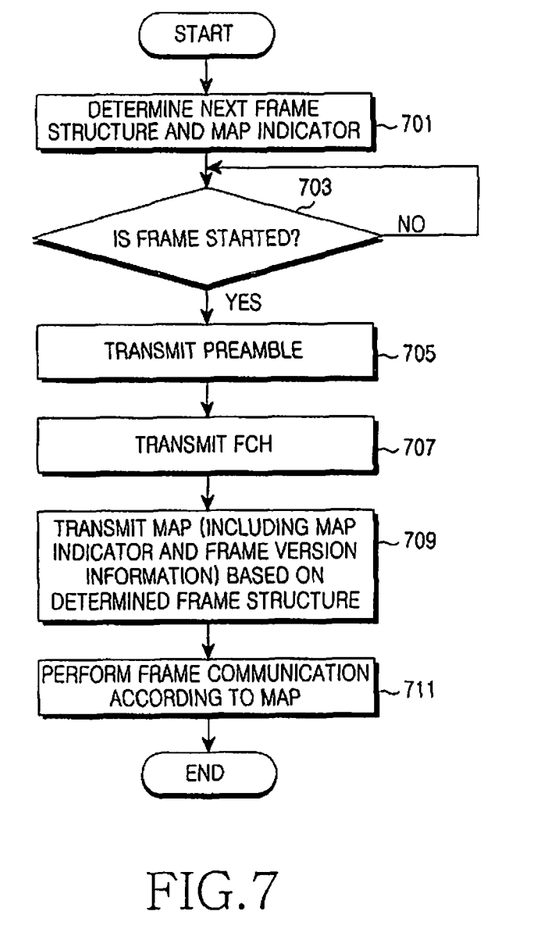
FIG. 7 is a flowchart illustrating an operation of a BS in a broadband wireless communication system supporting different frame structures according to an embodiment of the present invention.

FIG. 7 is a flowchart illustrating an operation of a BS in a broadband wireless communication system supporting different frame structures according to an embodiment of the present invention.

Referring to FIG. 7, the BS determines a frame structure to be provided in a next time period, and thus determines a MAP indicator and a MAP version index in step 701.

In step 703, the BS determines if a frame has started. If the frame has started, the BS performs frame communication according to the determined frame structure. That is, the BS transmits a preamble signal in a first head portion of the frame in step 705. The preamble signal is used when an MS obtains frame synchronization and searches for a cell.

In step 707, the BS transmits an FCH after the preamble signal is transmitted. The FCH includes basic structure information on the frame and also includes decoding information on DL-MAP. If different frame structures are provided in a TDM manner, one FCH may be transmitted during one frame time period. If the different frame structures are provided in an FDM manner, a plurality of FCHs may be transmitted during one frame time period. Each FCH may include sub-channel information (i.e., frequency band information) used in a corresponding frame and also include information for MAP decoding.

After transmitting the FCH, the BS generates a MAP message based on the determined frame structure, and transmits the generated MAP message in step 709. As described above, if the different frame structures are provided in a TDM manner, one MAP may be transmitted during one frame time period, and if the different frame structures are provided in an FDM manner, a plurality of MAPs may be transmitted during one frame time period.

The MAP message begins with a MAP indicator. If the MAP indicator is '00' or '01', it indicates a normal MAP. If the MAP indicator is '11', it indicates a compressed MAP. If the MAP indicates '10', it indicates a new MAP. In a case where the MAP indicator is set to '10' and thus indicates a new MAP message, a MAP version index may be additionally included. If a length of the version index is v bits, and a version of a current frame is N, the version index may be defined as [N mod $2^v$].

After transmitting the MAP message based on the determined frame structure, the BS performs frame communication according to content defined in the MAP message in step 711. That is, according to resource allocation information included in the MAP message, DL bursts are transmitted, and UL bursts are received.

Figure 8:
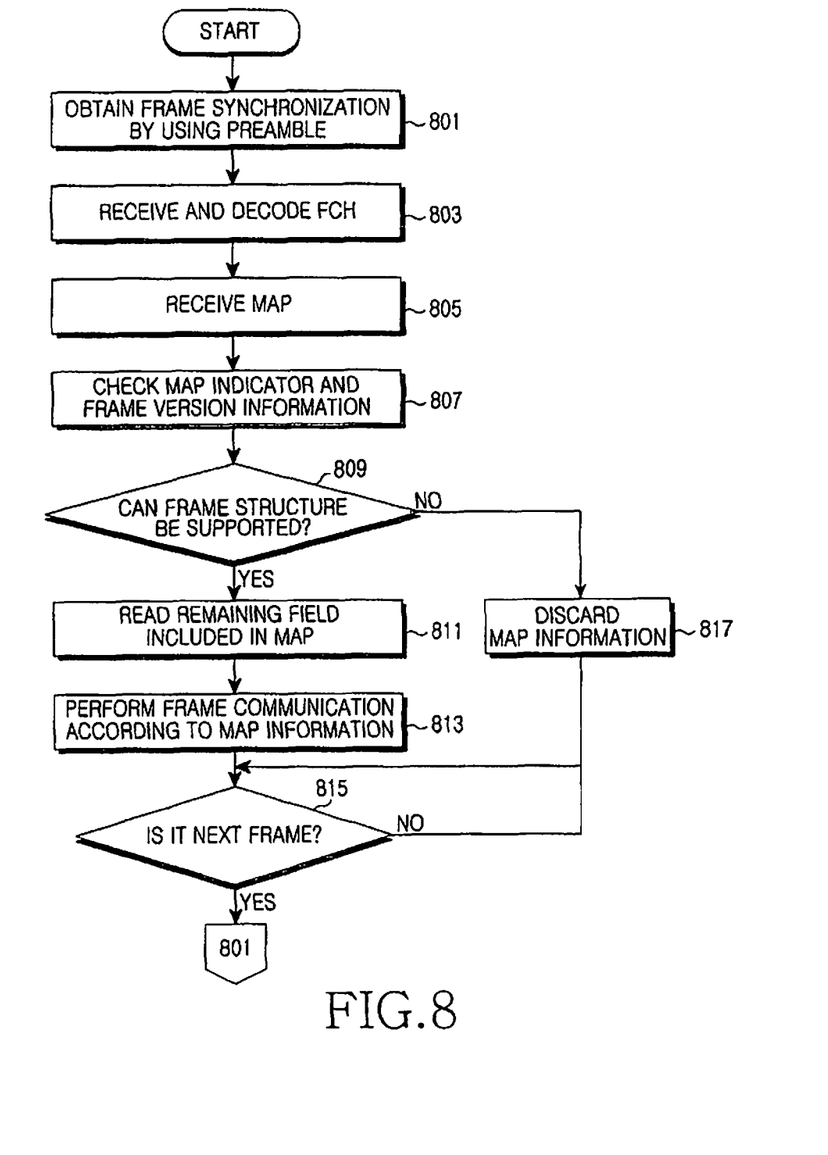
FIG. 8 is a flowchart illustrating an operation of an MS in a broadband wireless communication system supporting different frame structures according to an embodiment of the present invention.

FIG. 8 is a flowchart illustrating an operation of an MS in a broadband wireless communication system supporting different frame structures according to an embodiment of the present invention.

Referring to FIG. 8, the MS obtains frame synchronization by using a preamble signal received in a first head portion of a frame in step 801. After obtaining the frame synchronization, the MS decodes an FCH received subsequently to the preamble in step 803. The FCH may include basic structure information of a frame and also include decoding information on DL-MAP.

If different frame structures are provided in a TDM manner, the MS decodes the preamble, and then decodes at least one FCH received in at least one frequency band (or all segments). If the FCH is successfully decoded, the MS obtains information on a sub-channel used in a frame at which the FCH is successfully decoded, and also obtains information for the DL-MAP decoding.

As such, after obtaining the decoding information on the DL-MAP, the MS receives and decodes a MAP message in step 805. If the different frame structures are provided in an FDM manner, decoding may be performed by receiving at least one MAP message in a plurality of frequency bands. In step 807, the MS analyzes the MAP message. In this case, the MS checks a MAP indicator included in the MAP message, and thus determines whether the MAP message can be analyzed by the MS itself. If the MAP indicator is '00' or '01', it indicates a normal MAP. If the MAP indicator is '11', it indicates a compressed MAP. If the MAP indicator is '10', it indicates a new version of MAP. In a case where the MAP indicator is set to '10' and thus indicates a new MAP message, a MAP version index may be additionally included.

After checking the MAP indicator included in the MAP message, the MS determines whether a frame structure can be supported by using the MAP indicator in step 809. If the frame structure cannot be supported, the MS discards the received MAP message in step 817. Then, the MS waits for a next frame in step 815.

Otherwise, if the frame structure can be supported, the MS reads the remaining fields included in the MAP message and thus obtains information required for frame communication, in step 811. In step 813, the MS performs frame communication according to the obtained MAP information. That is, according to the resource allocation information of the MAP message, DL bursts are received, and UL bursts are transmitted.

In step 815, the MS waits for a next frame. When the next frame begins, the methodology returns to step 801, and the BS repeats the subsequent steps.

FIG. 9 is a diagram illustrating an example for supporting different frame structures in a broadband wireless communication system according to an embodiment of the present invention.

Referring to FIG. 9, different versions of frames are provided in a TDM manner. It is assumed that an MS1 supports only an old frame structure, and an MS2 supports not only the old frame structure but also a new frame structure. Then, the MS1 can perform communication using only old frames, which are provided alternately. However, the MS2 can analyze both old and new frames, and thus can perform communication using all frames.

FIG. 10 is a diagram illustrating another example for supporting different frame structures in a broadband wireless communication system according to an embodiment of the present invention.

Referring to FIG. 10, different versions of frames are provided in an FDM manner. It is assumed that an MS1 supports only an old frame structure, and an MS2 supports not only the old frame structure but also a new frame structure.

The MS1 can perform communication using only old frames, which are provided in a first frequency band. That is, the MS1 attempts FCH decoding only in a segment indicated by a preamble, and receives and decodes a MAP using a sub-channel (i.e., frequency band) indicated by an FCH. Data communication is made according to content indicated by the MAP.

However, since the MS2 can analyze both old and new frames, communication can be made using both the old frames, which are provided in the first frequency band, and the new frames, which are provided in a second frequency band. That is, the MS2 attempts FCH decoding not only in a segment (i.e., frequency band) indicated by the preamble but also in another segment. After one or more FCHs are successfully decoded, the MS2 obtains sub-channel information used in a corresponding frame and information for MAP decoding according to the decoding result of each FCH. The MS2 decodes the MAP using the obtained information, and performs data communication according to the result of MAP decoding.

A system may provide a new frame structure using the first frequency band. In this case, the MS1 checks a MAP indicator included in a MAP message received in the first frequency band, and thus, determines whether the frame structure can be supported. If the MAP indicator included in the MAP message is set to '10', it is determined that the frame structure cannot be supported, and communication on a corresponding frame is skipped.

Meanwhile, the MS2 checks the MAP message received in the first frequency band and the MAP message received in the second frequency band, and thus, determines whether frame structures thereof can be supported. If both of the frame structures can be supported, the MS2 can perform communication using all frames provided in both the first and second frequency bands.

Figure 11:
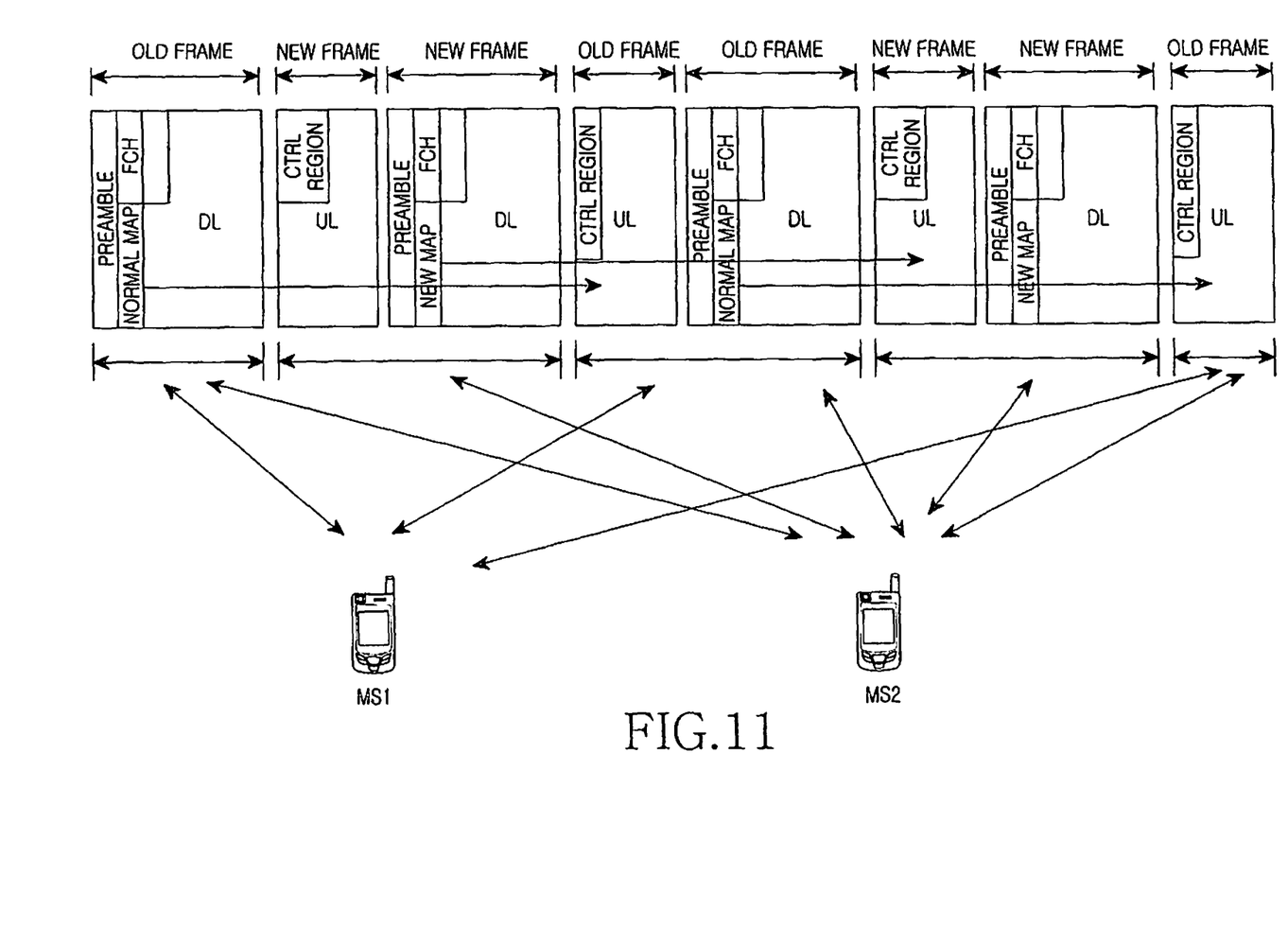
FIG. 11 is a diagram illustrating still another example for supporting different frame structures in a broadband wireless communication system according to an embodiment of the present invention.

FIG. 11 is a diagram illustrating still another example for supporting different frame structures in a broadband wireless communication system according to an embodiment of the present invention.

Similar to FIG. 9, different versions of frames are provided in a TDM manner. However, FIG. 11 differs from FIG. 9 in that a UL duration (or UL subframe) is delayed by one frame. As shown in FIG. 11, a DL duration of an old frame, a UL duration of a new frame, a DL duration of a new frame, and a UL duration of an old frame may be provided together.

According to the present invention, signaling is defined to inform a currently provided frame structure to an MS, and thus a system can support different frame structures. In particular, since a signaling for maintaining compatibility between an old version MS and a new version MS are proposed, both the old version MS and the new version MS can operate without errors.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A Base Station (BS) apparatus in a broadband wireless communication system supporting different frame structures, the apparatus comprising:
   a controller for determining a frame structure to be provided;
   a first Media Access Control (MAC) processor for generating a MAP message comprising a version index of the frame structure and an indicator that indicates a new standard if the provided frame structure conforms to the new standard; and
   a first Transmit (Tx) modem for performing physical layer encoding on the message generated by the first MAC processor,
   wherein the version index is determined by an Equation where version index=N mod 2v, where N denotes a version value, and V denotes a length of the version index.

2. The apparatus of claim 1, wherein, when the provided frame structure conforms to an old standard, further comprising:
   a second MAC processor for generating a MAP message conforming to the old standard; and
   a second Tx modem for performing physical layer encoding on the message generated by the second MAC processor.

3. The apparatus of claim 2, further comprising a multiplexer for multiplexing a first signal received from the first Tx modem and having a first frame structure, and a second signal received from the second Tx modem and having a second frame structure.

4. The apparatus of claim 3, wherein the multiplexer performs time division multiplexing or frequency division multiplexing on the first signal having the first frame structure and the second signal having the second frame structure.

5. The apparatus of claim 4, wherein, if the first signal having the first frame structure and the second signal having the second frame structure are subject to the frequency division multiplexing, a plurality of MAP messages are transmitted during one frame time period.

6. The apparatus of claim 3, further comprising a Radio Frequency (RF) transmitter for converting a signal received from the multiplexer into an RF signal and for transmitting the RF signal through an antenna.

7. The apparatus of claim 1, wherein the first Tx modem comprises:
   an encoder for encoding the MAP message generated by the first MAC processor;
   a modulator for modulating data received from the encoder;
   a resource mapper for mapping data, received from the modulator, to a specific region of a frame; and
   an Orthogonal Frequency Division Multiplexing (OFDM) modulator for performing an Inverse Fast Fourier Transform (IFFT) operation on data received from the resource mapper.

8. A Mobile Station (MS) apparatus in a broadband wireless communication system supporting different frame structures, the apparatus comprising:
   a Receive (Rx) modem for obtaining frame synchronization using a preamble signal, and for receiving and decoding at least one MAP message received in at least one frequency band; and
   a Media Access Control (MAC) processor for determining whether the MAP message conforms to a new standard using a MAP indicator included in the MAP message received from the Rx modem,
   wherein the MAP message conforming to the new standard comprises a version index of the frame structure, and
   wherein the version index is determined by an Equation where version index=N mod 2v, where N denotes a version value, and V denotes a length of the version index.

9. The apparatus of claim 8, wherein the Rx modem comprises:
   an Orthogonal Frequency Division Multiplexing (OFDM) demodulator for performing a Fast Fourier Transform (FFT) operation on a received baseband signal;
   an extractor for extracting a MAP burst from data received from the OFDM demodulator;
   a demodulator for demodulating data received from the extractor; and
   a decoder for decoding data received from the demodulator and obtaining the MAP message.

10. The apparatus of claim 8, wherein frames having the different structures are provided in a time-division multiplexing manner or a frequency-division multiplexing manner.

11. The apparatus of claim 10, wherein, when the frames having the different structures are provided in the frequency-division multiplexing manner, the Rx modem decodes a plurality of MAP messages during one frame time period.

12. A communication method of a Base Station (BS) in a broadband wireless communication system supporting different frame structures, the method comprising the steps of:
   determining a frame structure to be provided;
   generating a MAP message comprising an indicator that indicates a new standard if the provided frame structure conforms to the new standard; and
   transmitting the generated MAP message by performing physical layer encoding thereon,
   wherein the MAP message conforming to the new standard comprises a version index of the frame structure, and
   wherein the version index is determined by an Equation where version index=N mod 2v, where N denotes a version value, and V denotes a length of the version index.

13. The method of claim 12, wherein, when the provided frame structure conforms to an old standard, further comprising:
   generating a MAP message conforming to the old standard; and
   transmitting the generated MAP message by performing physical layer encoding thereon.

14. The method of claim 12, wherein frames having the different structures are provided in a time-division multiplexing manner or a frequency-division multiplexing manner.

15. The method of claim 14, wherein, if the frames having the different structures are provided in the frequency-division multiplexing manner, a plurality of MAP messages are transmitted during one frame time period.

16. The method of claim 12, wherein the step of transmitting the generated MAP message comprises:
   encoding and modulating the generated MAP message;
   mapping the modulated data to a specific resource of a frame;
   performing Orthogonal Frequency Division Multiplexing (OFDM) on the mapped data; and
   converting the OFDM-modulated data into a Radio Frequency (RF) signal and transmitting the RF signal.

17. A communication method of a Mobile Station (MS) in a broadband wireless communication system supporting different frame structures, the method comprising the steps of:
   obtaining frame synchronization by using a preamble signal;
   decoding at least one MAP message received in at least one frequency band, after obtaining the frame synchronization;
   determining whether the MAP message conforms to a new standard by checking a MAP indicator included in the MAP message; and
   analyzing the remaining fields included in the MAP message according to the new standard, when the MAP message conforms to the new standard,
   wherein the MAP message conforming to the new standard comprises a version index of the frame structure, and
   wherein the version index is determined by an Equation where version index=N mod 2v, where N denotes a version value, and V denotes a length of the version index.

18. The method of claim 17, wherein the step of decoding of the MAP message comprises:
   performing Orthogonal Frequency Division Multiplexing (OFDM) demodulation on a received signal;
   extracting a MAP burst from the OFDM-modulated data; and
   demodulating and decoding the extracted data.

19. The method of claim 17, wherein frames having different structures are provided in a time-division multiplexing manner or a frequency-division multiplexing manner.

* * * * *